(12) United States Patent
Chang et al.

(10) Patent No.: US 6,941,107 B2
(45) Date of Patent: Sep. 6, 2005

(54) STRATOSPHERIC PLATFORM BASED SURFACE VEHICLE TRACKING AND MOBILE DATA NETWORK

(75) Inventors: Donald C. D. Chang, Thousand Oaks, CA (US); Wah L. Lim, Newport Beach, CA (US); Ming U. Chang, Rancho Palos Verdes, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 582 days.

(21) Appl. No.: 10/017,249

(22) Filed: Dec. 14, 2001

(65) Prior Publication Data

US 2002/0107034 A1 Aug. 8, 2002

Related U.S. Application Data

(60) Provisional application No. 60/262,702, filed on Jan. 19, 2001.

(51) Int. Cl.[7] .............................................. H04B 7/185
(52) U.S. Cl. ..................... 455/12.1; 455/405; 455/427; 455/456
(58) Field of Search ........................... 455/405, 9, 427, 455/456, 12.1; 379/58, 60; 701/208, 213; 342/354; 370/437

(56) References Cited

U.S. PATENT DOCUMENTS

| | | | |
|---|---|---|---|
| 2,470,787 A | 5/1949 | Nosker | |
| 3,384,891 A | 5/1968 | Anderson | |
| 3,544,995 A | 12/1970 | Bottenberg et al. | |
| 4,161,730 A | 7/1979 | Anderson | |
| 4,161,734 A | 7/1979 | Anderson | |
| 4,359,733 A | 11/1982 | O'Neill | |
| 4,613,864 A | 9/1986 | Hofgen | |
| 4,897,661 A | 1/1990 | Hiraiwa | |
| 5,006,855 A | 4/1991 | Braff | |
| 5,099,245 A | 3/1992 | Sagey | |

(Continued)

FOREIGN PATENT DOCUMENTS

| | | |
|---|---|---|
| EP | 0 845 874 A2 | 6/1998 |
| EP | 0 860 708 A2 | 8/1998 |
| EP | 0 860 709 A2 | 8/1998 |
| EP | 0860 710 A2 | 8/1998 |
| EP | 1 010 988 A2 | 6/2000 |
| GB | 2 271 902 A | 4/1994 |
| GB | 2 306 827 | 5/1997 |
| JP | 2-028580 | 1/1990 |
| JP | 3-291584 | 12/1991 |
| JP | 4-27887 | 1/1992 |

(Continued)

OTHER PUBLICATIONS

Bricker, P. et al.: "Integrated Receiver For NASA Tracking And Data Relay Satellite System", 1990, pp. 1–5.

(Continued)

*Primary Examiner*—Sonny Trinh
*Assistant Examiner*—Phuoc Doan
(74) *Attorney, Agent, or Firm*—Georgann S. Grunebach

(57) ABSTRACT

A mobile communication system includes at least one user terminal and a plurality of satellites which transmit and receive a plurality of communication signals to and from the user terminal. The communication signals transmitted to and received from the plurality of satellites by a gateway station. The gateway station in turn is in communication with a processing center to process said communication signals. The processing center uses polystatic triangulation to determine a position of the at least one user terminal and redirect a signal from at least one said plurality of satellites in response to the determined position of the at least one user terminal.

20 Claims, 1 Drawing Sheet

U.S. PATENT DOCUMENTS

| | | | |
|---|---|---|---|
| 5,111,209 A | 5/1992 | Toriyama | |
| 5,126,748 A | 6/1992 | Ames et al. | |
| 5,365,447 A | 11/1994 | Dennis | 364/449 |
| 5,444,450 A | 8/1995 | Olds et al. | |
| 5,525,995 A | 6/1996 | Benner | |
| 5,664,006 A * | 9/1997 | Monte et al. | 455/405 |
| 5,764,188 A | 6/1998 | Ghosh et al. | 342/457 |
| 5,903,549 A | 5/1999 | Von der Embse et al. | 370/310 |
| 5,920,284 A | 7/1999 | Victor | |
| 5,944,770 A | 8/1999 | Enge et al. | |
| 5,945,948 A | 8/1999 | Buford et al. | |
| 5,949,766 A | 9/1999 | Ibanez-Meier et al. | |
| 5,969,674 A | 10/1999 | von der Embse et al. | |
| 5,974,039 A | 10/1999 | Schilling | 370/335 |
| 6,061,562 A | 5/2000 | Martin et al. | 455/431 |
| 6,151,308 A | 11/2000 | Ibanez-Meier et al. | 370/316 |
| 6,229,477 B1 | 5/2001 | Chang et al. | |
| 6,246,363 B1 | 6/2001 | Yung et al. | |
| 6,340,947 B1 | 1/2002 | Chang et al. | 342/357.01 |
| 6,377,208 B2 | 4/2002 | Chang et al. | 342/357.01 |
| 6,388,615 B1 | 5/2002 | Chang et al. | 342/368 |
| 6,636,721 B2 * | 10/2003 | Threadgill et al. | 455/12.1 |
| 2001/0045903 A1 | 11/2001 | Chang et al. | 342/357.01 |
| 2002/0107034 A1 | 8/2002 | Chang et al. | 455/456 |
| 2003/0158656 A1 * | 8/2003 | David | 701/208 |

FOREIGN PATENT DOCUMENTS

| | | |
|---|---|---|
| JP | 07146995 A | 6/1995 |
| JP | 08015405 A | 1/1996 |
| JP | 09026328 A | 1/1997 |
| JP | 09113600 A | 5/1997 |
| JP | 10090391 A | 4/1998 |
| WO | WO 99/13598 | 3/1999 |
| WO | WO 99/23769 | 5/1999 |

OTHER PUBLICATIONS

Teles. J. et al.: "Overview of TDRSS", pp. 67–76.

Colella, Nicholas J. et al., "The HALO network™", IEEE Communications Magazine, Jun. 2000, pp. 142–148.

U.S. Appl. No. 09/611,753, filed Jul. 7, 2000, Chang et al.

* cited by examiner

STRATOSPHERIC PLATFORM BASED SURFACE VEHICLE TRACKING AND MOBILE DATA NETWORK

CROSS-REFERENCE TO RELATED APPLICATIONS

The present application claims priority from Provisional Application Ser. No. 60/262,702, entitled "Stratospheric Platform Based Surface Vehicle Tracking And Mobile Data Network," filed Jan. 19, 2001, which application is hereby specifically incorporated by reference as though set forth fully herein.

TECHNICAL FIELD

The present invention relates generally to a method and system for determining a position of a mobile terminal in a mobile communication system, and more particularly to a method and system for a mobile terminal tracking method and system having high rate data service that does not require GPS.

BACKGROUND OF THE INVENTION

Communication satellites have become commonplace for use in many types of communication services, e.g., data transfer, voice communications, television spot beam coverage, and other data transfer applications. As such, "bent pipe" satellites transmit and receive large amounts of signals that may use a "multiple spot beam" configuration to transmit signals to desired geographic locations on the earth. Mobile applications such as telephones and personal digital applications are also becoming increasingly popular.

Architectures having the ability to track the position or location of a mobile user are now known. These systems allow for a decrease in platform stability requirements, which in turn can lower the overall cost of the system. One exemplary architecture is disclosed in application Ser. No. 09/587,758 and provides for a third generation (3G) mobile communications system to mobile terminals. The 3G mobile communications system provides high data rate communications to a user enabling simultaneous voice, data and entertainment communication. Knowledge of user location allows for fewer code division multiple access (CDMA) code handoffs. In a fixed-cell-structured system, when a user crosses a boundary of two cells, CDMA code handoff must happen to avoid interference. With a beam following a user scheme, the user would not have to change his CDMA code unless he gets too close to another user who is using the same CDMA code. This system uses a global positioning system GPS to determine the position of a user and thus the user terminals need to be GPS enabled so as to decrease handoffs and avoid interference. However, global positioning systems can be costly to produce due to the inclusion of hardware into the mobile user terminals.

The architecture of the above system allows the mobile terminals to communicate with the gateway through multiple stratospheric platforms. Each platform has array elements that are transponded to and from the gateways where beamforming is performed digitally rather than implementing a complete phased array antenna on each of the platforms. This array configuration allows the gateway to form beams for each individual mobile terminal and track the moving terminals. Multiple platforms in a region increases system capacity by allowing frequency reuse with the directional mobile terminal antenna or by providing additional processing gain for a given terminal.

Additionally, various methods for location tracking of mobile users are also known. These methods allow the systems to track mobile terminals within the system. One such location tracking system is based on a two-way ranging method. One implementation of this method is through polystatic triangulation which utilizes three platforms where forward signal paths can be different from the return paths. The system can be calibrated by providing triangulation to earth stations. Other methods of tracking mobile users are also well known.

While the above-described methods and systems are satisfactory, a continuous concern of mobile communication engineers is to increase performance and reduce the number of components used in a mobile communication system. Reducing the number of components is important because it decreases weight, decreases costs involved in production and implementation, and potentially increases accuracy and efficiency of the communication system.

It would therefore be desirable to develop a mobile communication system with fewer components and increased efficiency and accuracy that also allows for the communication of data, voice, and other information to the mobile terminal.

SUMMARY OF THE INVENTION

It is therefore an object of the present invention to provide a mobile communication system that has the ability to determine vehicle position without the need for a global positioning system (GPS).

It is a further object of the present invention to provide a mobile communication system that is significantly less expensive than prior systems that utilize GPS.

It is still another object of the present invention to provide a mobile communication system that aggregates all of the mobile communication signals through one common gateway station, which allows for additional location tracking functions to be easily implemented.

It is yet another object of the present invention to provide a mobile communication system that can incorporate user terminals which may or may not be GPS enabled.

It is still a further object of the present invention to provide a mobile communication system with increased accuracy in position prediction of user terminals over traditional two-way ranging prediction techniques.

In accordance with the above and the other objects of the present invention, a mobile communication system is provided which has the capability of determining a position of a mobile vehicle within the system. The mobile communication system includes at least one mobile user terminal. The at least one mobile user terminal is in communication with a plurality of satellites to effectuate the transfer or communication of signals therebetween. Each of the plurality of satellites is in communication with a gateway, which transmits the signals to and receives them from each of the plurality of satellites. The gateway station is also in communication with a processing station, which determines a polystatic triangulation position for the at least one user terminal and redirects a satellite beam in response to the position of the at least one user terminal.

BRIEF DESCRIPTION OF THE DRAWING

For a more complete understanding of this invention, reference should now be had to the embodiments illustrated in greater detail in the accompanying figure and described below by way of example.

DETAILED DESCRIPTION OF THE PREFERRED EMBODIMENT

Figure 1:
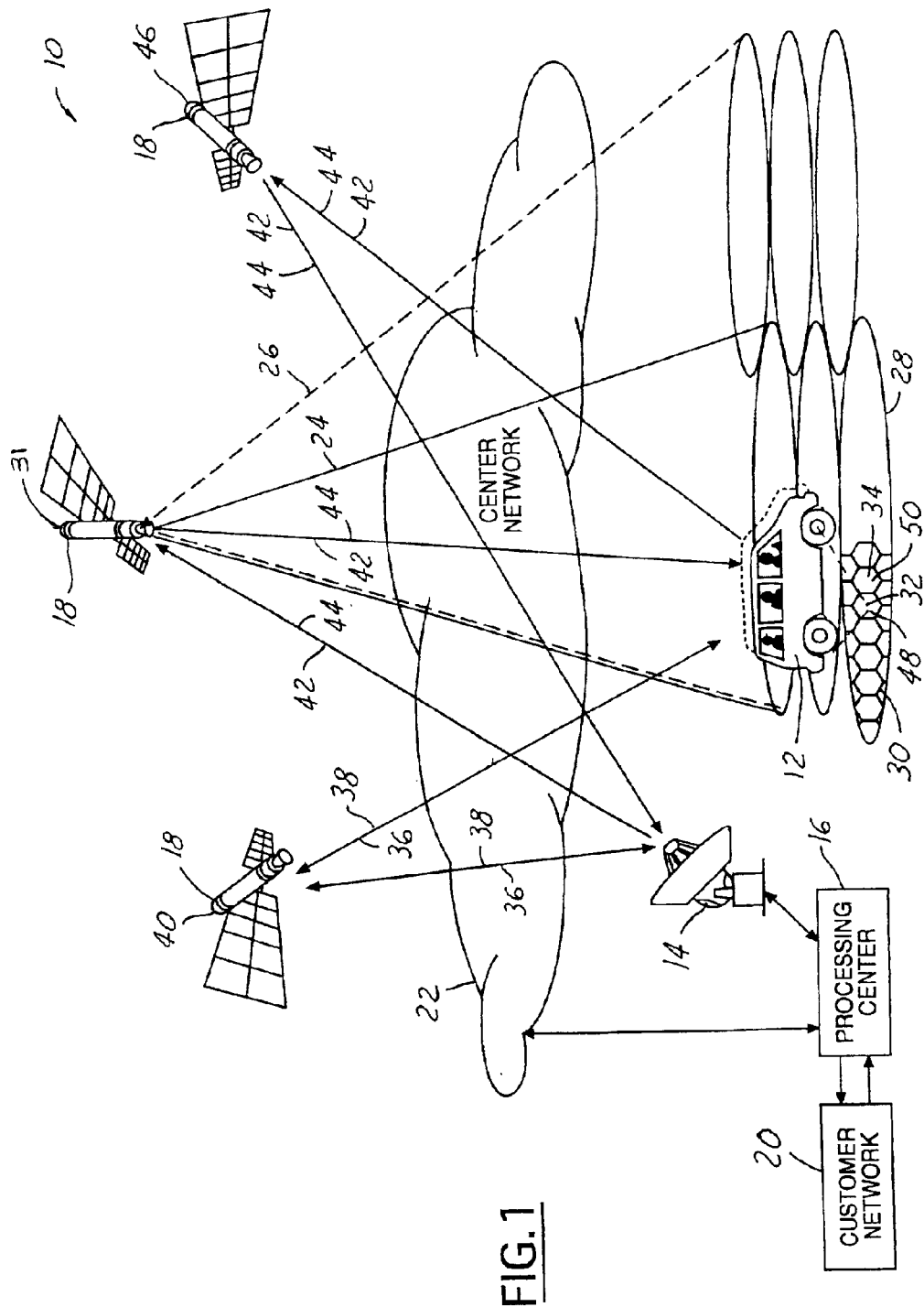
FIG. 1 is a block diagrammatic view of a mobile communication system in accordance with a preferred embodiment of the present invention.

In the following description, various operating parameters and components are described for one constructed embodiment. These specific parameters and components are included as examples and are not meant to be limiting.

Referring now to FIG. 1, a mobile communication system 10 in accordance with the preferred embodiment is disclosed. The disclosed mobile communication system 10 is intended to overcome the limitations and disadvantages discussed above and provide a more efficient system for determining the position of a user terminal within the mobile communication system 10. As discussed in more detail below, the mobile communication system 10 preferably determines the position of a user terminal 12 without the use of a global positioning satellite system (GPS). By determining the position of the user terminal 12 without the use of a GPS system the mobile communication system 10 becomes more cost effective and efficient.

FIG. 1 illustrates a block diagrammatic view of the mobile communication system 10 in accordance with an embodiment of the present invention. The system 10 includes a gateway station 14 in communication with a processing center 16. The processing center 16 transmits communication signals to and receives communication signals from the user terminal 12. The processing center 16 transmits and receives communication signals via the gateway station 14, which are transmitted to and received from stratospheric platforms 18. The stratospheric platforms 18 in turn transmit to and receive communication signals from the user terminal 12.

The processing center 16 is also in communication with a customer network 20 and a center network 22, as is discussed in more detail below. The processing center 16 preferably uses polystatic triangulation to determine the position of the user terminal 12 and to instruct the stratospheric platform 18 to redirect a satellite beam 24 in response to the determined position of the user terminal 12. An exemplary polystatic triangulation technique is disclosed in U.S. application Ser. No. 09/587,756, entitled "Micro Cell Architecture For Mobile User Tracking Communication System," which is hereby specifically incorporated by reference. The mobile communication system 10 is preferably configured such that all communication signals are aggregated at the gateway station 14, and processed therethrough. The disclosed system 10 only illustrates a single gateway station 14, however it will be understood that multiple stations may be utilized. Moreover, while only a limited number of stratospheric platforms 18 are illustrated any number may be utilized.

The stratospheric platform 18 performs platform operations, which include creating multiple beams 24 within a coverage area 26. Each beam 24 creates a footprint that provides or defines a cell 28. Each cell 28 is divided into a plurality of microcells 30. For example, a beam 42 is directed at the user terminal 12 in a first microcell 32 for direct communication between the platform 18 and the user terminal 12. The platform 18 has the ability to redirect the beam 42 and change the microcell 32 to which the beam 42 is directed depending upon the location of the user terminal 12. A communication signal that is being transmitted to a first microcell 32 may be redirected to a second microcell 34 without discontinuity during the redirection.

Stratospheric based systems, such as that of the present invention, do not require the large infrastructures typically required by satellite based systems. In stratospheric platform based mobile communication systems, array elements are transponded to and from gateway stations where beamforming is performed digitally versus satellite communication systems that use a complete phase array antenna on each satellite. Although the present invention prefers the use of stratospheric platforms because of their optimum regional coverage, the above-described beam changing techniques may also be implemented in satellites. The above-mentioned techniques provide direct, strong, and clear communication between stratospheric platforms and user terminals and the tracking techniques are preferably performed without the need for GPS.

It will be understood that the user terminal 12 may be either mobile or stationary. The user terminal 12 may be any of the following: a data capable phone, a personal computer, a personal digital assistant PDA, a navigation system, a GPS, or other suitable communication device. The user terminal 12 is capable of transmitting and receiving communication signals to and from a stratospheric platform or a satellite. Of course, although a single user terminal is illustrated the present invention is applicable for an almost unlimited number of user terminals.

The mobile communication system 10 of the present invention preferably uses a polystatic configuration. The polystatic configuration consists of several transceivers allocated within the platform 18, at separate known locations, which cooperate with each other. The platforms 18 may be relatively stationary or moving with respect to the gateway station 14 and the user terminal 12.

The processing center 16 in using polystatic triangulation to determine a user terminal position by transmitting ranging signals from the stratospheric platform 18. For convenience, three individual stratospheric platforms 18 are identified separately by reference numbers 31, 40, and 46. In operation, the processing center 16 transmits a first ranging signal 36 and a third ranging signal 38 to the user terminal 12 via a first platform 40, having a first known location. The processing center 16 also transmits a second ranging signal 42 and a fourth ranging signal 44 to the user terminal 12 via the second platform 31 having a second know location. The user terminal 12 retransmits the first ranging signal 36 and the third ranging signal 38 back to the gateway station 14 via the first platform 40 and retransmits the second ranging signal 42 and the fourth ranging signal 44 back to the gateway station 14 via a third platform 46, having a third known location.

The processing center 16 determines a first delay, a second delay, a third delay, and a fourth delay corresponding to time difference between transmission and receipt of the first ranging signal 36, the second ranging signal 38, the third ranging signal 42, and the fourth ranging signal 44 respectively. The processing center 16 then determines a first position of the user terminal 12 in response to the first known location, the second known location, and the third known location and the first delay and the second delay. The processing center 16 determines a second position, different from the first position, of the user terminal 12 in response to the first known location, the second known location, and the third known location and the third delay and the fourth delay, thereby determining that the user terminal 12 has moved.

In determining movement of the user terminal 12 and the round trip time of travel of the transmitted and received ranging signals 36, 38, 42, and 44, the processing center 16 may also measure the frequency shift in the transmitted and received ranging signals. The frequency shifts and round trip times of the transmitted and received ranging signals 36, 38, 42, and 44 are transformed into communication lengths, which are then transformed into a set of ranges, and finally into a three dimensional vector position of the user terminal 12. The positioning technique using frequency shifts and travel times is further described in the U.S. Pat. No. 6,229, 477, which is hereby specifically incorporated by reference herein.

The processing center 16 in response to the movement of the user terminal 12 signals the platform 31 via the gateway station 14 to redirect the beam 24 from the first microcell 32 to a second microcell 34. The second microcell 34 may be an adjacent microcell to the first microcell 32. A satellite may be used in place of any of the above-mentioned platforms. The platforms 18 are able to both perform satellite and stratospheric platform operations. The use of the platforms 18 in the mobile communication system 10 allows for increased ability to transmit and receive additional ranging signals to additional stratospheric platforms that are in addition to the platforms illustrated, thereby increasing the prediction of the position of the user terminal 12. The processing center 16 may also introduce different coding techniques for signal identification as known in the art.

The customer network 20 may include mobile communication networks and phone networks. The customer network 20 is in communication with the user terminal 12 and any other user terminals such that the processing center 16 can transmit and receive communication signals between the user terminal 12 and other user terminals. Additionally, the center network 22 is preferably in communication with any of the following information networks: an Internet, an Intranet, or other wide range information network. The processing center 16 transmits and receives communication signals between the user terminal 12 and one of the above-mentioned information networks.

The present invention by implementing polystatic triangulation within a mobile communication system provides high data rate transfer without the use of GPS. The present invention also decreases costs of production of said user terminals, increases accuracy in user terminal position prediction, and increases overall performance of a mobile communication system. While the user terminals 12 preferably do not use GPS, they may alternatively be configured to utilize GPS.

Having now fully described the invention, it will be apparent to one of ordinary skill in the art that many changes and modifications can be made thereto without departing from the spirit or scope of the invention as set fourth herein.

What is claimed is:

1. A mobile communication system comprising:
   a first user terminal;
   a plurality of stratospheric platforms in communication with said first user terminal to transfer a plurality of communication signals therebetween;
   a gateway station in communication with said plurality of stratospheric platforms for transferring said plurality of communication signals therebetween; and
   a processing center in communication with said gateway station, said processing center determining a polystatic triangulation position for said first user terminal and redirecting a stratospheric platform beam in response to said determined position of said first user terminal.

2. The system as recited in claim 1, further comprising:
   a customer network in communication with said processing center, said customer network relaying communication signals between said first user terminal and a second user terminal.

3. The system as recited in claim 2, further comprising:
   a center network in communication with said processing center, said center network transferring said plurality of communication signals between said first user terminal and an Internet.

4. The system as recited in claim 1, wherein the mobile communication system is configured such that all of said plurality of communication signals are aggregated at said gateway station.

5. A mobile communication system comprising:
   a stratospheric platform having stratospheric platform operations, including creating a plurality of beams within a coverage area, a first beam being directed to at least one user terminal at a first microcell and a plurality of additional beams illuminating microcells immediately adjacent said first microcell;
   a gateway station transmitting a first ranging signal and a third ranging signal to said at least one user terminal via a first platform, having a first known location and transmitting a second ranging signal and a fourth ranging signal to said at least one user terminal via a second platform having a second known location;
   said at least one user terminal retransmitting said first ranging signal and said third ranging signal back to said gateway station via said first platform and retransmitting said second ranging signal and said fourth ranging signal back to said gateway station via a third platform, having a third known location; and
   a processing center in communication with said gateway station determining a first, a second, a third, and a fourth delay corresponding to time differences between transmission and receipt of said first ranging signal, said second ranging signal, said third ranging signal, and said fourth ranging signal respectively;
   said processing center determining a first position of said user terminal in response to said first known location, said second known location, and said third known location as well as said first delay and said second delay;
   said processing center determining a second position, different from said first position, in response to said first known location, said second known location, and said third known location as well as said third delay and said fourth delay, thereby determining movement of said at least one user terminal;
   said processing center signaling said stratospheric platform via said gateway station to redirect said first beam from said first microcell to a second microcell, in response to said movement.

6. The system as recited in claim 5, wherein said first beam is redirected from said first microcell to a second microcell, which is located adjacent to and different from said first microcell.

7. The system as recited in claim 5, further comprising:
   a customer network in communication with said processing center, said customer network relaying communication signals between a plurality of user terminals.

8. The system as recited in claim 5, further comprising:
   a center network in communication with said processing network.

9. The system as recited in claim 8, wherein said center network is in communication with an Internet or Intranet.

10. The system as recited in claim 5, wherein said stratospheric platforms are replaced by a first satellite, a second satellite, or a third satellite, which perform the respective satellites operations in addition to said stratospheric platform operations.

11. The system as recited in claim 5, wherein said processing center measures the strength of a signal received from said at least one user terminal and signals said stratospheric platform to redirect said first beam from said first microcell to a second microcell, in response to said signal received.

12. The system as recited in claim 5, wherein the mobile communication system is configured such that all communication signals are aggregated at said gateway station.

13. A method of determining a position of at least one user terminal within a mobile communication system, which includes a plurality of stratospheric platforms having known locations respectively and a gateway station, said method comprising:

transmitting and receiving a plurality of communication signals between said plurality of stratospheric platforms and said at least one user terminal;

transmitting and receiving said plurality of communication signals between said plurality of stratospheric platforms and a gateway station;

determining a position of said at least one user terminal through the use of polystatic triangulation;

redirecting a beam of a stratospheric platform in response to said determined position of said at least one user terminal.

14. The method as recited in claim 13, further comprising:
transmitting and receiving said plurality of communication signals to and from a customer network.

15. The method as recited in claim 13, further comprising:
transmitting and receiving said plurality of communication signals to and from a center network.

16. A method of determining a position of at least one user terminal within a mobile communication system, which includes a first, a second, and a third satellite having a first, a second, and a third known location respectively, said method comprising:

creating a plurality of beams within a coverage area, a first beam directed at the at least one user terminal in a first microcell and a plurality of additional beams illuminating microcells immediately adjacent said first microcell;

transmitting a first ranging signal and a third ranging signal to the at least one user terminal via the first satellite;

transmitting a second ranging signal and a fourth ranging signal to the at least one user terminal via the second satellite;

retransmitting said first and said third ranging signals back to a gateway station via said first satellite;

retransmitting said second and said fourth ranging signals back to said gateway station via a third satellite;

determining a first delay, a second delay, a third delay, and a fourth delay corresponding to time differences between transmission and receipt of said first ranging signal, said second ranging signal, said third ranging signal, and said fourth ranging signal respectively;

determining a first position of the at least one user terminal in response to said first known location, said second known location, and said third known location and said first delay and said second delay;

determining a second position of the at least one user terminal in response to said first known location, said second known location, and said third known location and said third delay and said fourth delay;

determining movement of the at least one user terminal in response to said first position and said second position; and redirecting, in response to said movement, said first beam from said first microcell to a second microcell.

17. The method as recited in claim 16, further comprising:
relaying communication signals between a plurality of user terminals.

18. The method as recited in claim 16, further comprising:
transferring communication signals between said plurality of user terminals and an Internet or intranet connection.

19. The method as recited in claim 16, further comprising:
a gateway station in communication with each of said first satellite said second satellite, and said third satellite.

20. The method as recited in claim 16, further comprising:
a stratospheric platform for creating said plurality of beams.

* * * * *